(12) United States Patent
Song

(10) Patent No.: US 8,139,617 B2
(45) Date of Patent: Mar. 20, 2012

(54) MODE-LOCKER COMPRISING A GRAPHENE, AND PULSE LASER DEVICE COMPRISING THE SAME

(75) Inventor: Yong-Won Song, Seoul (KR)

(73) Assignee: Korea Institute of Science and Technology, Seongbuk-Gu, Seoul (KR)

( * ) Notice: Subject to any disclaimer, the term of this patent is extended or adjusted under 35 U.S.C. 154(b) by 8 days.

(21) Appl. No.: 12/760,696

(22) Filed: Apr. 15, 2010

(65) Prior Publication Data
US 2011/0158268 A1    Jun. 30, 2011

(30) Foreign Application Priority Data

Dec. 30, 2009    (KR) .................. 10-2009-0133788

(51) Int. Cl.
*H01S 3/30* (2006.01)
*H01S 3/098* (2006.01)

(52) U.S. Cl. .............................. 372/18; 372/6
(58) Field of Classification Search .................. 359/896; 372/18, 6
See application file for complete search history.

(56) References Cited

U.S. PATENT DOCUMENTS

2004/0213302 A1* 10/2004 Fermann et al. ............. 372/6
2010/0002324 A1* 1/2010 Rozhin et al. ............. 359/896
* cited by examiner

*Primary Examiner* — Patrick Stafford
(74) *Attorney, Agent, or Firm* — Lexyoume IP Group, PLLC

(57) ABSTRACT

The present invention relates to a mode-locker including a graphene and a laser pulse device. The mode-locker mode-locks a laser that propagates through a laser oscillation loop. The mode-locker includes: i) a core; ii) cladding that surrounds the core, wherein a groove is formed on a side of the cladding; and iii) a graphene layer that is located in the groove and is formed to be extended along a direction to be parallel to a transferring direction of the laser such that a laser pulse is formed by the interaction of the graphene and the field of the propagating laser mode.

11 Claims, 9 Drawing Sheets

MODE-LOCKER COMPRISING A GRAPHENE, AND PULSE LASER DEVICE COMPRISING THE SAME

CROSS-REFERENCE TO RELATED APPLICATION

This application claims priority to and the benefit of Korean Patent Application No. 10-2009-0133788 filed in the Korean Intellectual Property Office on Dec. 30, 2009, the entire content of which is incorporated herein by reference.

BACKGROUND OF THE INVENTION (a) Field of the Invention

The present invention relates to a mode-locker including a graphene, and a laser pulse device. More specifically, the present invention relates to a mode-locker that is capable of effectively mode locking a laser pulse by using the graphene, and a laser pulse device including the same.

(b) Description of the Related Art

It has been reported that a semiconductor manufactured by using silicon faces a limitation point in terms of integration and processing speed. For example, when a line width of the central processing unit (CPU) is controlled to be not more than 10 nm in order to miniaturize the CPU manufactured using silicon, usefulness of the CPU is radically deteriorated due to distorted electromagnetic characteristics. Furthermore, when the CPU is manufactured by nanotechnology grafting, the price of the CPU is increased.

Therefore, research and development has been actively conducted for improving the data processing speed and quality by using optics with a large bandwidth. When a large amount of data is sent or received, the light can minimize heat generation of the part and interference. Here, a laser pulse with a high speed has largely contributed to development of multiplexing and a switch with a high speed that are important for processing a large amount of light signals. A high speed laser pulse provides speed and quality that cannot be compared with signal formation and signal processing formed by modulation of a general continuous wave.

SUMMARY OF THE INVENTION

A mode-locker including a graphene that is capable of effectively causing a laser to be pulsed is provided. In addition, a laser pulse device including the mode-locker is provided.

The mode-locker according to an embodiment of the present invention includes: i) a core; ii) cladding that surrounds the core, wherein a groove is formed on a side of the cladding; and iii) a graphene layer that is located in the groove and is formed to be extended along a direction to be parallel to a transferring direction of the laser such that a laser pulse is formed.

The groove may include a flat surface, and the graphene layer is formed on the flat surface. The graphene layer may be formed by spray coating, and the graphene layer may be formed of a single atom layer.

The mode-locker according to an embodiment of the present invention is transferred through a laser oscillation loop. The mode-locker includes: i) fibers that are extended along one direction and are spaced apart from each other; ii) a graphene layer that is located between the fibers and neighboring the fibers and that is adapted to form a laser pulse; and iii) a fixed member that surrounds the fibers. The fibers include: i) a core; and ii) cladding that surrounds the core. The core contacts the graphene layer.

The graphene layer may include: i) a pair of first surfaces that are opposed to each other and contact the core; and ii) a second surface that is located between the pair of first surfaces and connects the pair of first surfaces with each other. The graphene layer may be formed by spray coating. The graphene layer may be formed of a single atom layer.

A laser pulse device according to an embodiment of the present invention includes: i) an amplifier that amplifies a laser that is transferred along a laser oscillation loop; ii) a mode-locker that is connected to the amplifier and controls the laser; iii) a polarization controller that is connected to the mode-locker and controls polarization of the laser; iv) a coupler that is connected to the polarization controller and branches the laser; v) an isolator that is connected to the coupler and prevents backflow of the laser; and vi) a fiber that connects the amplifier, the mode-locker, the polarization controller, the coupler, and the isolator with each other. The mode-locker includes a graphene layer that is adapted to form a laser pulse.

The mode-locker may further include: i) a core; and ii) cladding that surrounds the core, wherein a groove is formed on a side of the cladding. The graphene layer may be located in the groove and is formed to be extended along a direction to be parallel to a transferring direction of the laser. The groove may include a flat surface, and the graphene layer is formed on the flat surface. The mode-locker may include i) fibers that are extended along one direction and are spaced apart from each other; and ii) a fixed member that is located between the fibers and neighboring the fibers and that is adapted to form a laser pulse. The fibers may include: i) a core; and ii) cladding that surrounds the core. The core may contact the graphene layer.

The graphene layer may include: i) a pair of first surfaces that are opposed to each other and face the core; and ii) a second surface that is located between the pair of first surfaces and connects the pair of first surfaces with each other.

DETAILED DESCRIPTION OF THE EMBODIMENTS

Figure 1:
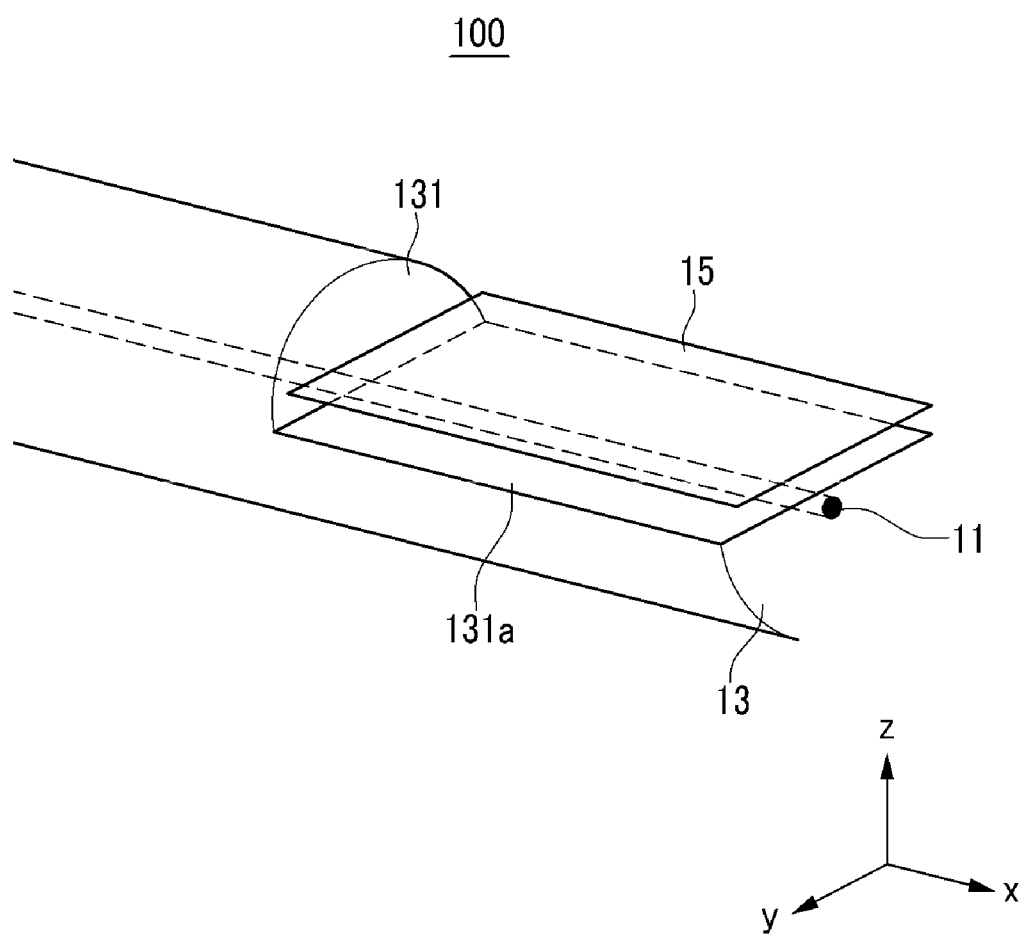
FIG. 1 is a schematic partial perspective view of a mode-locker according to a first embodiment of the present invention.

Exemplary embodiments of the present invention described with reference to cross-sectional views represent ideal exemplary embodiments of the present invention in detail. Therefore, various modification of diagrams, for example, modifications of manufacturing methods and/or specifications, are expected. Accordingly, the exemplary embodiments are not limited to specific shapes of shown regions, and for example, also include modifications of the shape by manufacturing. For example, regions shown or described as flat may generally have rough or rough and nonlinear characteristics. Further, portions shown to have sharp angles may be rounded. Therefore, the regions shown in the drawings are basically just schematic and the shapes thereof are not intended to show the exact shapes of the region and are also not intended to reduce the scope of the present invention.

All the terminologies including technical terms and scientific terms used herein have the same meanings that those skilled in the art generally understand and as terms defined in dictionaries, and are construed to have meanings corresponding to related technical documents and the present description, such that they are not construed as ideal or overly official meanings, if not defined.

It will be understood that when an element is referred to as being "on" another element, it can be directly on another element or intervening elements may be present therebetween. In contrast, when an element is referred to as being "directly on" another element, there are no intervening elements therebetween.

It will be understood that, although the terms first, second, third, etc., may be used herein to describe various elements, components, regions, layers, and/or sections, they are not limited thereto. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

Terminologies used herein are provided to merely mention specific exemplary embodiments and are not intended to limit the present invention. Singular expressions used herein include plurals unless they have definitely opposite meanings. The meaning of "including" used in this specification gives shape to specific characteristics, regions, positive numbers, steps, operations, elements, and/or components, and do not exclude the existence or addition of other specific characteristics, regions, positive numbers, steps, operations, elements, components, and/or groups.

Spatially relative terms, such as "below" and "above" and the like, may be used herein for ease of description to describe one element or feature's relationship to another element(s) or feature(s) as illustrated in the figures. It will be understood that spatially relative terms are intended to encompass different orientations of the device in use or operation in addition to the orientation depicted in the drawings. For example, if the device in the figures is turned over, elements described as "below" other elements or features would then be oriented "above" the other elements or features. Thus, the exemplary term "below" can encompass both an orientation of above and below. Apparatuses may be otherwise rotated 90 degrees or at other angles, and the spatially relative descriptors used herein are then interpreted accordingly.

FIG. 1 shows a schematic partial perspective view of a mode-locker 100 according to a first embodiment of the present invention. The structure of the mode-locker 100 of FIG. 1 is merely to illustrate the present invention and the present invention is not limited thereto. Therefore, the structure of the mode-locker 100 can be changed to other forms.

As shown in FIG. 1, the mode-locker 100 includes a core 11, cladding 13, and a graphene layer 15. The mode-locker 100 can include other elements if necessary. Although the graphene layer 15 is shown to be spaced apart from a flat surface 131a for convenience of explanation, the graphene layer 15 is directly formed on the flat surface 131a in actuality. The graphene layer 15 included in the mode-locker 100 is explained in detail below.

A saturable absorption material is inserted into the mode-locker 100. Light with a low intensity is absorbed to the saturable absorption material while light with high intensity passes through the same. Particularly, if the saturable absorption material is a nano-scaled material, integration of a system is favorable and a process can be simplified since the saturable absorption material can be inserted into a desirable place in the laser oscillator. In addition, a pulse with high quality can be generated by a fast recovery time and high nonlinearity of the nano-scaled material.

The graphene can function as a saturable absorption material that satisfies the above conditions. If the saturable absorption characteristics of the graphene are realized, a laser pulse of a picosecond or femtosecond can be generated. Carbon atoms are regularly arranged into two dimensions in the graphene. Since the graphene has a structure of a point bandgap in which a bandgap between the valence and conduction energy bands is zero, all the light can be absorbed without limitation of wavelength. Therefore, a broadband light signal can be processed. The above contents are explained in detail with reference to FIG. 2 below.

Figure 2:
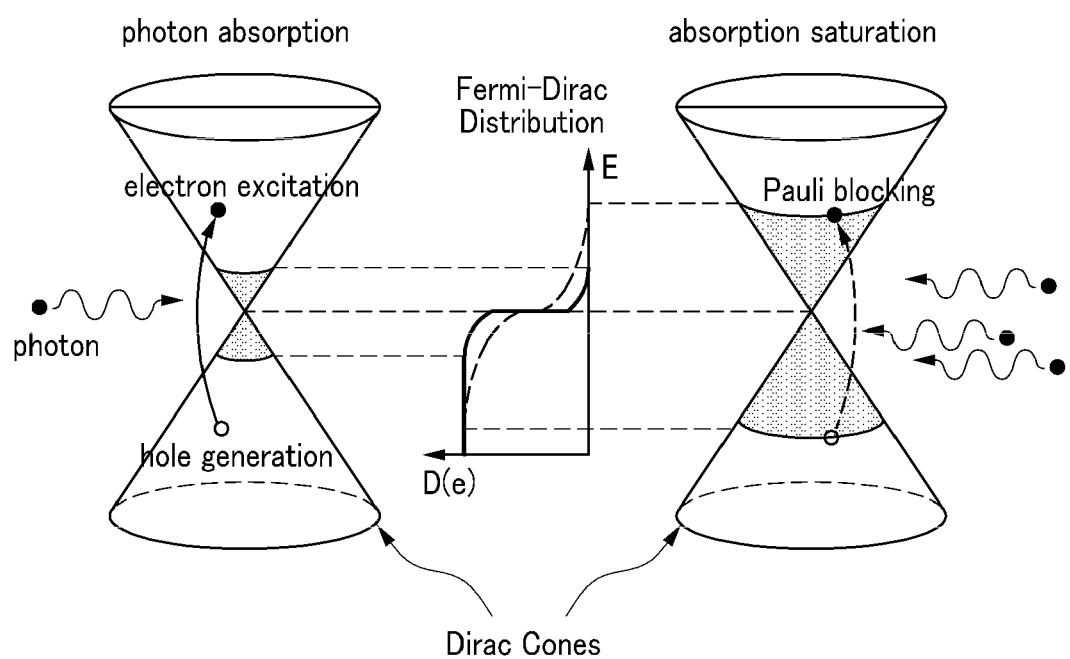
FIG. 2 is a diagram that conceptually shows light absorption characteristics of the graphene with a point bandgap structure.

FIG. 2 conceptually shows saturable absorption characteristics of the graphene with a point bandgap structure. The left portion of FIG. 2 shows light absorption linearity while the right portion of FIG. 2 shows saturable absorption non-linearity of the graphene therewith. The center portion of FIG. 2 shows electron density D(e) obtained by combining Fermi-Dirac distribution function with a state density. Gray areas in left and right portions of FIG. 2 mean a charged state.

As shown in the left portion of FIG. 2, if an amount of absorbed photons is small, electrons generate holes in the valence band and are then excited to a specific location of a conduction band corresponding to a wavelength of a photon. The generated Dirac-fermion exchanges energy to be cooled down with a plasmon or phonon located on a surface of the graphene. As a result, Dirac-fermion satisfies a distribution of the Dirac-fermion distribution. Therefore, generated holes and electrons are gradually charged from an end of a valence band and a conduction band and then a width of the charged energy band is widened, and thereby photons with the same wavelength cannot be absorbed by the Pauli blocking.

That is, as shown in the right portion of FIG. 2, when the amount of photons is sufficiently large, generated carriers fill in an energy state and then results in a state in which the energy is no longer excited since the electrons are Pauli-blocked by occupied carriers. This can be explained by saturable absorption by the graphene.

As shown in the center portion of FIG. 2, the energy bandgap is shown as a Dirac cone in a space formed by a two-dimensional momentum plane and an energy axis. The electron density D(e) is known to be gradually increased at a specific portion of the energy band as the saturable absorption appears by the graphene.

Meanwhile, the laser pulse can be generated not by using the mode-locker 100 (shown in FIG. 1, hereinafter the same) but by using a mechanical on/off switching and Q switching. However, in this case, reproducibility of the generated laser pulse is deteriorated and the width of a pulse is too large. In addition, there is a limitation in forming a pulse of a femtosecond ($10^{-15}$ seconds).

Meanwhile, when carbon nanotubes (CNT) are used instead of the graphene, the carbon nanotubes are agglomerated with each other and then non-linearity thereof is deteriorated since the carbon nanotubes have a high specific surface. In addition, recovery time of the carbon nanotubes is not more than 500 fs, which is shorter than that of a semiconductor device but longer than that of graphene. Also, the carbon nanotubes are difficult to align, and chirality and diameter control thereof are difficult. As a result, it is difficult to control the bandgap of the carbon nanotubes. Therefore, since an operating bandwidth of the carbon nanotubes is limited, other kinds of carbon nanotubes should be mixed therewith and then the operating bandwidth should be moved and/or widened in order to solve the above problem. However, in this case, efficiency of the mode-locker 100 is reduced.

Figure 3:
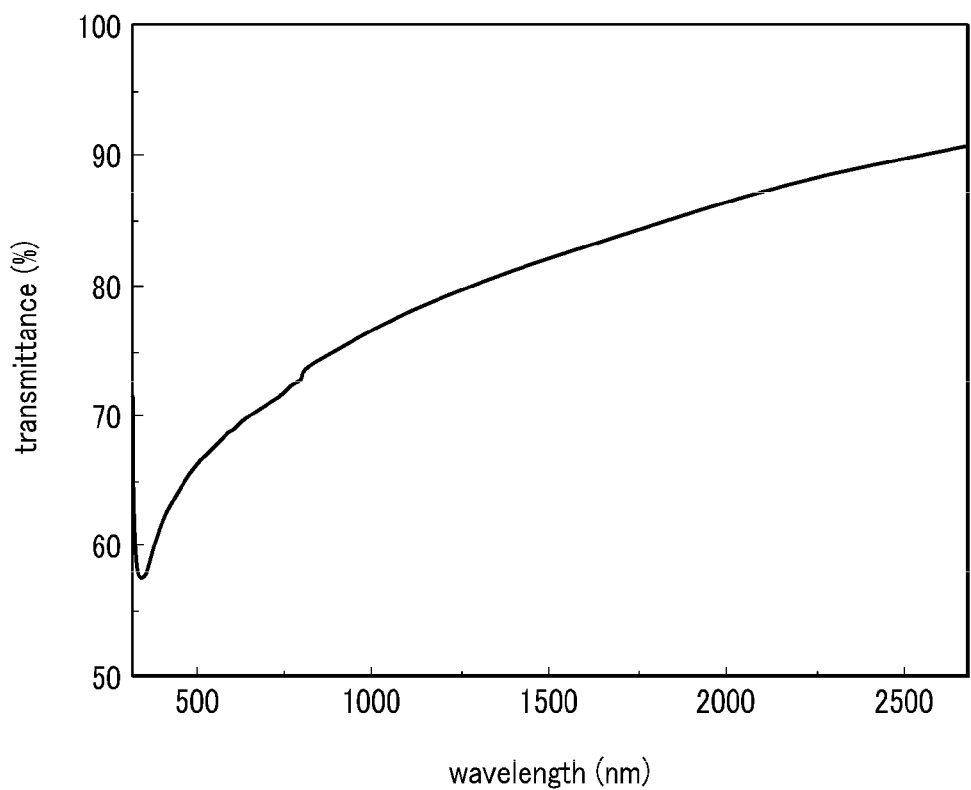
FIG. 3 is a graph that shows transmittance of the graphene.

FIG. 3 is a graph showing transmittance of the graphene. That is, transmittance of the light according to the wavelength of the light is shown.

As shown in FIG. 3, the graphene has a large operating bandwidth with an order of micrometers. Since the graphene has non-linearity and is contaminated by hydrocarbon and its distraction is increased as the graphene goes near an oscillation frequency of the crystal lattice, a substantial transmittance is more deteriorated in a low wavelength area.

Since the graphene has such characteristics, it is desirable to manufacture the mode-locker 100 by using a graphene that mode-locks the laser transferred along a laser oscillation loop. The graphene has a quicker recovery time than that of the carbon nanotubes, and manufacture thereof is easy and has an ultrawide band operating spectrum. Therefore, the graphene can easily generate a bandwidth light signal and process it.

Returning to FIG. 1, the laser pulse is transferred along the X-axis direction where the core 10 is extended. A groove 131 is formed on a side of the cladding 20 surrounding the core 10. Since the cladding 20 completely surrounds the core 10, the groove 131 does not contact with the core 10.

As shown in FIG. 1, the graphene layer 15 is located in the groove 131. The groove 131 can be formed by grinding the cladding 13 by using an abrasive. The graphene layer 15 is formed on the flat surface 131a of the groove 131 by spray coating the graphene solution.

The graphene layer 15 is manufactured by oxidizing and reducing graphite. The graphene layer 15 can be easily manufactured by using the following method. Firstly, the graphite is manufactured into an oxidized graphite water solution by using a hummer method. A liquid-containing well-dispersed oxidized graphene is manufactured. Oxidized graphene is reduced by hydrazine hydrate/$NH_3$, and then a graphene solution is manufactured. The graphene particles contained in the graphene solution are stably dispersed. The graphene solution is neutralized by dialysis, and then the graphene solution is protected by forming an oil layer. The oil layer prevents re-oxidation of the graphene that can occur at a contact surface of air.

The graphene layer 15 is formed to be extended along a direction to be parallel to the X-axis direction that is a propagating direction of the laser pulse. The graphene layer 15 can be located along a ZX plane direction and an XY plane direction. The graphene layers 15 can be formed to be very thin as single- or multi-atom layers.

Figure 4:
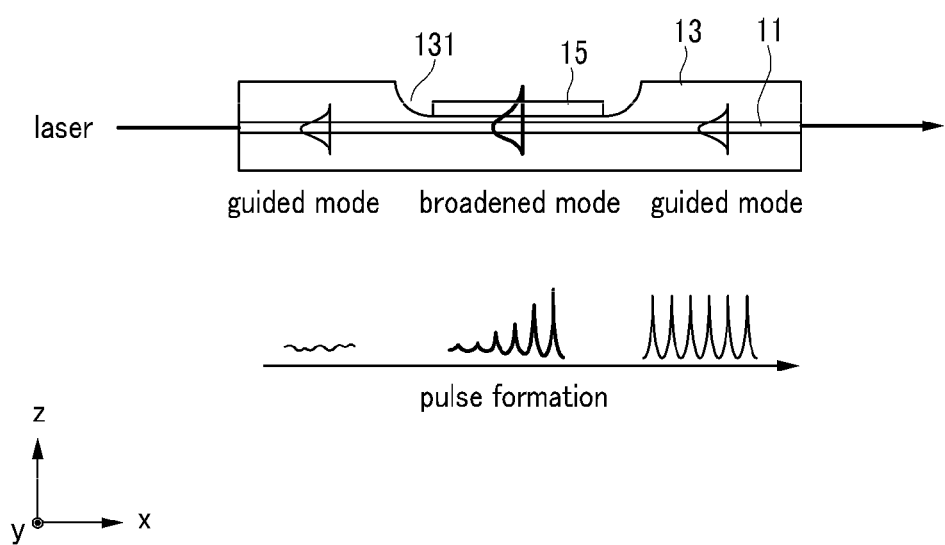
FIG. 4 is a conceptual operating diagram of the mode-locker of FIG. 1.

FIG. 4 shows a conceptual operation of the mode-locker 100 of FIG. 1.

As shown in FIG. 4, the laser is guided through the core 11 that is extended along the X-axis direction. Since the core 11 is not cut by the graphene layer 15, the laser is continuously guided without being blocked by the graphene layer 15. The laser, which is propagated through the core 11, is guided by a refractive index difference of the core 11 and the cladding 13. A portion of the guided laser reacts with the graphene layer 15 and then forms the laser pulse. That is, a mode field becomes wide as an effective refractive index of the cladding 13 becomes low. For example, the effective refractive index of the cladding 13 is reduced as the cladding 13 filled with a silica with a refractive index of about 1.5 is replaced by air with a refractive index of about 1 by the groove 13. As a result, the mode field becomes wide. Here, the laser pulse is formed by a mutual reaction of the mode field widely spreading at a ground portion of the groove 131 and the graphene layer 15. A tail portion of the widely spread mode field is called an evanescent field.

Here, the graphene layer 15 is not thermally damaged by the evanescent field reaction in which the laser partly reacts with the graphene layer 15. A resource material, which is combusted by even an optical intensity of about 15 dBm at the core 15, is stably operated without being combusted at an even optical intensity of not less than 15 dBm. That is, the graphene layer 15 can be semi-permanently used since damage to the graphene layer 15, which is weak to heat, is negligible. As a result, a carbon nano-structure of the graphene layer 15, which is weak to heat, can be stabilized by applying the evanescent field interaction even at a function of the high power laser. The laser pulse, which is formed to be guided by the graphene layer 15, is propagated along the X-axis direction while boarding the core 11.

Figure 5:
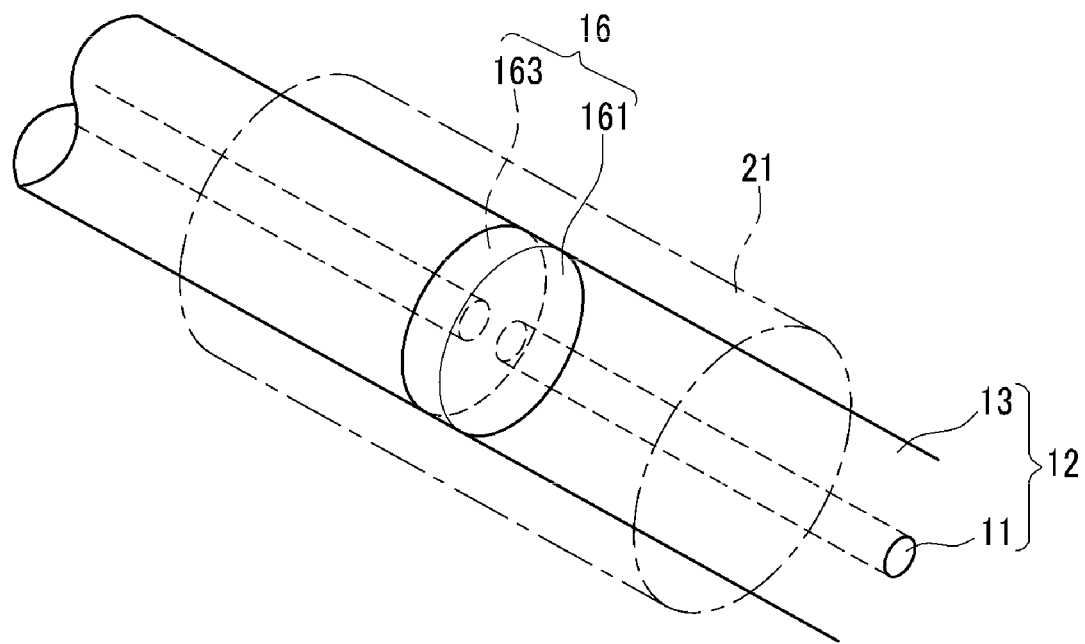
FIG. 5 is a schematic partial perspective view of a mode-locker according to a second embodiment of the present invention.

FIG. 5 shows a schematic partial perspective view of a mode-locker 200 according to the second embodiment of the present invention. The structure of the mode-locker 200 of FIG. 5 is merely to illustrate the present invention, and the present invention is not limited thereto. Therefore, the structure of the mode-locker 200 can be changed into other forms.

Since the structure of the mode-locker 200 is similar to that of the mode-locker 100 of FIG. 1, like reference numerals refer to like elements and detailed description thereof is omitted. In addition, although the fixed member 21 can be formed with opaque materials, an inner portion of the fixed member 21 is shown to be visible for convenience of explanation.

As shown in FIG. 5, the mode-locker 200 includes fibers 12 that are spaced apart from each other along the X-axis direction. A graphene layer 16 is located between the fibers 12 and contacts the fibers 12. The laser propagating through the core 11 forms a pulse by the graphene layer 16. The graphene layer 16 is inserted between the fibers 12 to be sandwiched, and the fibers 12 are fixed by using a fixed member 21. The fixed member 21 functions as a sleeve.

The graphene layer 16 includes a pair of first surfaces 161 and a second surface 163. The pair of first surfaces 161 are formed to be in a line on an XY plane. The second surface 163 is formed to be curved. Therefore, the graphene layer 16 is integrally formed with the fibers 16.

As shown in FIG. 5, the laser transmits through the graphene layer 16. Therefore, the graphene layer 16 may be thermally shocked since it receives all the energy of the laser. However, the mode-locking can be more effectively performed by using the graphene layer 16 rather than other nano-structured layers such as carbon nanotubes and so on.

Figure 6:
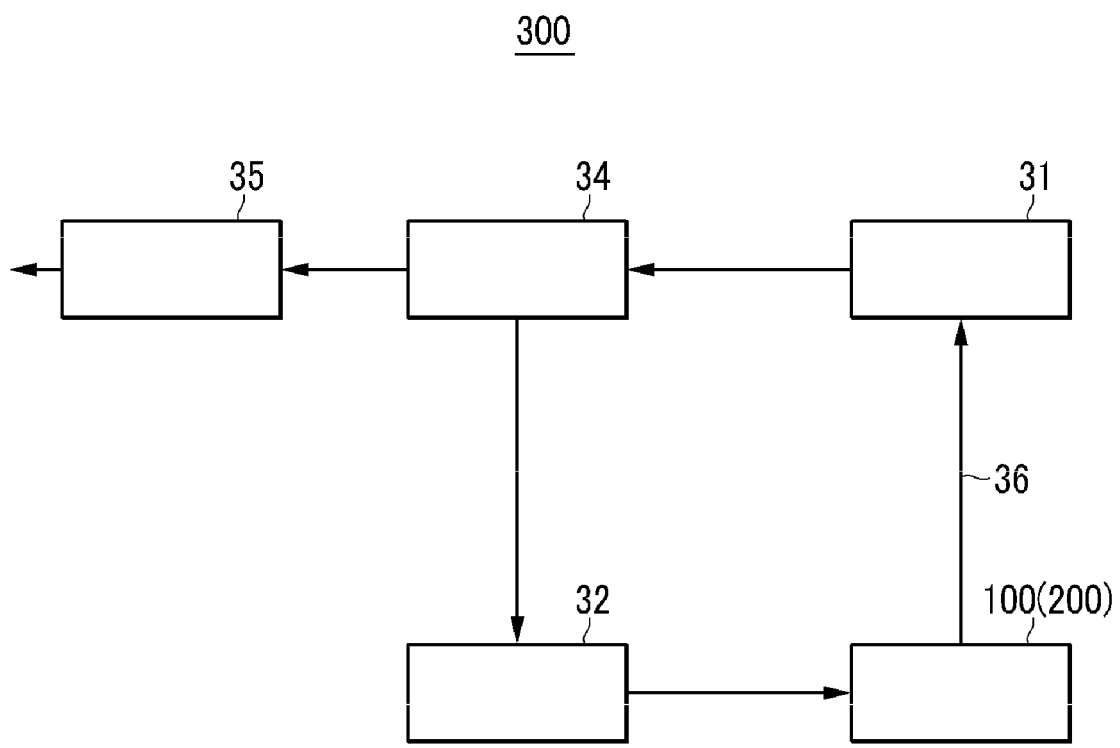
FIG. 6 is a schematic view of a laser pulse device including the mode-locker of FIG. 3.

FIG. 6 schematically shows a laser pulse device 300 including the mode-locker 100 of FIG. 1 or the mode-locker 200 of FIG. 3. The structure of the laser pulse device 300 of FIG. 1 is merely to illustrate the present invention and the present invention is not limited thereto.

As shown in FIG. 6, the laser pulse device 300 includes an amplifier 31, a mode-locker 100 or 200, a polarization controller 32, a coupler 34, an isolator 35, and a single mode fiber (SMF) 36. In addition, the laser pulse device 300 can further include other devices if necessary.

As shown in FIG. 6, the amplifier 31, the mode-locker 100 or 200, the polarization controller 32, the coupler 34, and the single mode fiber (SMF) 36 forms a laser oscillation loop. The laser pulse is transferred while flowing along the direction indicated by the arrow.

The amplifier 31 amplifies the laser pulse generated in the laser oscillator (not shown, hereinafter the same). A solid laser used in the laser oscillator can be a ruby, Nd:YAG (neodymium-doped yttrium aluminum garnet, Nd:$Y_3Al_5O_{12}$, Nd:glass (neodymium glass), Ti:sapphire, and so on. The laser oscillated from the laser oscillator can momentarily output a large laser pulse while passing through the amplifier 31. For example, an EDFA (Er-doped fiber amplifier) can be used as the amplifier 31.

As shown in FIG. 6, the mode-lockers 100 and 200 form the laser pulses and guide them into the fiber 36. The mode-lockers 100 and 200 include graphene. A broadband operation of the laser pulse formation can be realized by using the graphene.

A plurality of modes occur in the laser resonance loop. Here, each mode is independently oscillated with each other. However, if each mode has a suitable phase relation by changing a resonance condition in the laser pulse device 300, pulses with a very short width are generated per suitable time interval.

The polarization controller 32 is connected to the mode-lockers 100 and 200 through the fiber 36. The polarization controller 32 controls polarization of the propagating mode in the laser cavity.

As shown in FIG. 6, the coupler 34 branches the laser pulse that propagates from the amplifier 31 through the fiber 36. One branched laser pulse is guided to the isolator 35 and the other branched laser pulse is guided to the polarization controller 32 through the fiber 36 again. Meanwhile, the light flows along one direction since the isolator 35 prevents back-flow of the laser pulse. The fiber connects the amplifier, the mode-locker, the polarization controller, the coupler, and the isolator with each other. A single-mode fiber (SMF) can be used as the fiber 36.

The laser pulse can be effectively generated by using the above laser pulse device 300. A mode that is advanced through the laser resonance cavity can form a laser pulse by directly transmitting only the mode-lockers 100 and 200 or can form a laser pulse by using only partial energy of the mode functioned by an evanescent field and the graphene layer.

The present invention will be explained in detail with reference to the exemplary example below. The exemplary example of the present invention is merely to illustrate the present invention and the present invention is not limited thereto.

Experiment Example
Mode-Locker Manufacturing Experiment

The mode-locker was manufactured by the above method, using the graphene. Other portions except the above method of manufacturing the mode-locker can be easily understood by those skilled in the art, so a detailed description thereof is omitted.

Experiment Example 1

D-shaped fiber was prepared by polishing the cladding of a SMF, and a graphene solution was spray-coated on the polished surface thereof. When the D-shaped fiber was fabricated, the surface of the fiber was polished by using abrasives. The surface of the fiber was polished by using abrasives with sizes of 15 μm, 5 μm, 1 μm, and 0.3 μm in four steps. Therefore, laser scattering loss was controlled to be not more than 1 dB after the surface of the fiber was polished. The fiber was polished in order to enhance the broadening of the evanescent field and to minimize the scattering loss on the surface. The amount of final loss was maintained to be not more than 1 dB by measuring loss during the polishing process.

Experiment Example 2

A graphene solution was coated and dried on an end portion of the fiber made of a ferrule by using a spray method. The other end portion of the fiber made of the ferrule was connected thereto by a sleeve. Therefore, the laser directly transmits the graphene layer by sandwiching the coated graphene layer. Transmittance of the graphene layer was maintained at about 85% by spray coating the graphene layer on an end portion of the fiber. A single-mode fiber was used and the ferrule was made of a ceramic.

Figure 7:
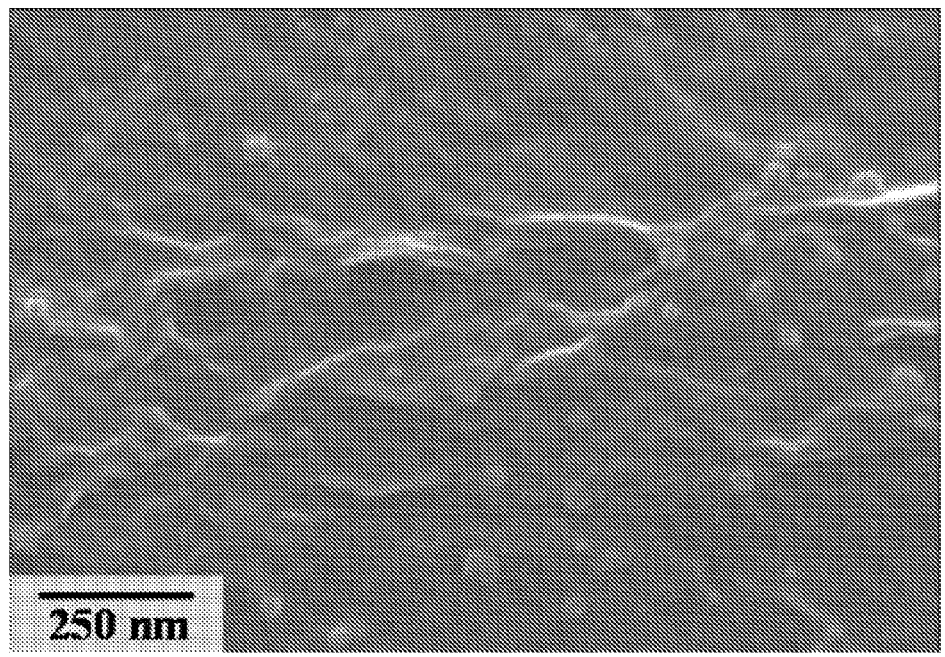
FIG. 7 is a scanning electronic microscope photograph of the graphene manufactured by an experimental example of the present invention.

FIG. 7 shows a scanning electron microscopy photograph of the graphene layer used in the mode-locker manufactured by the experimental example of the present invention.

As shown in FIG. 7, wrinkles were formed on the graphene layer. The graphene layer was dried while the wrinkles were present on the graphene layer. Recovery time of the graphene layer was measured to be not more than about 200 fs. This was much shorter than the recovery time of the carbon nanotubes.

Laser Pulse Device Manufacturing Experiment

A laser pulse device was manufactured by using the mode-locker of the above Experimental Example 1. Other portions except the above method of manufacturing the pulse laser can be easily understood by those skilled in the art, so a detailed description thereof is omitted.

Figure 8:
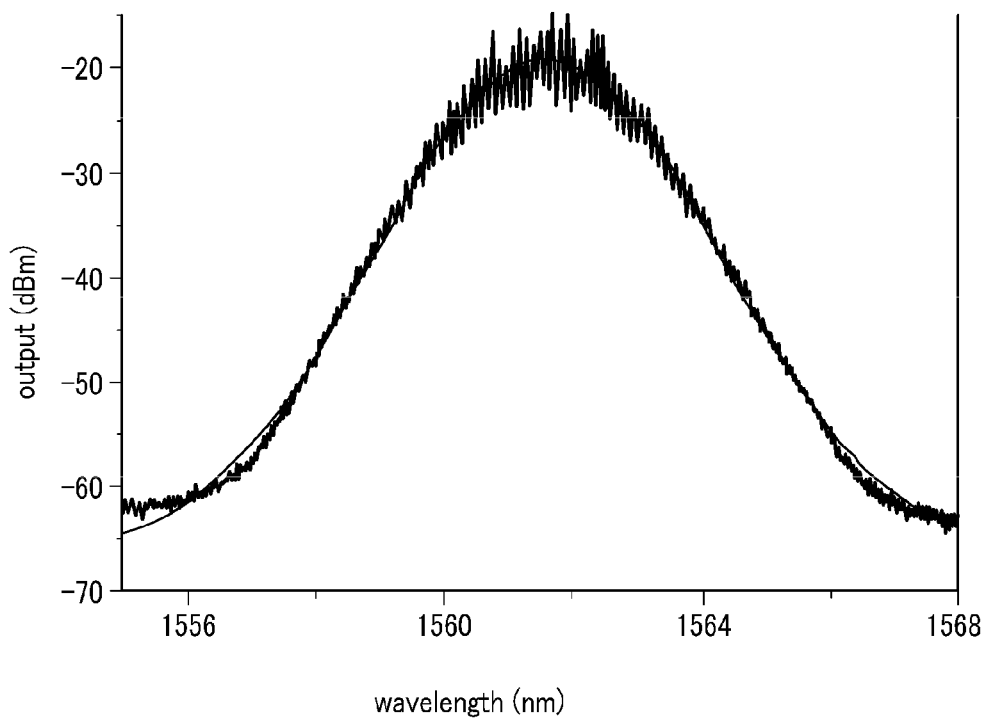
FIG. 8 is a graph that shows a laser pulse spectrum output from the laser pulse device manufactured by an experimental example of the present invention.

FIG. 8 is a graph showing a laser pulse output spectrum from the laser pulse device manufactured according to the experimental example of the present invention.

As shown in FIG. 8, a plurality of sub-peaks were formed with sub-cavities formed in the fiber. However, the peaks entirely showed a pulsed output, and full width half maximum (FWHM) was about 1.96 nm. In addition, a wavelength of the pulse central portion was 1561.6 nm.

Figure 9:
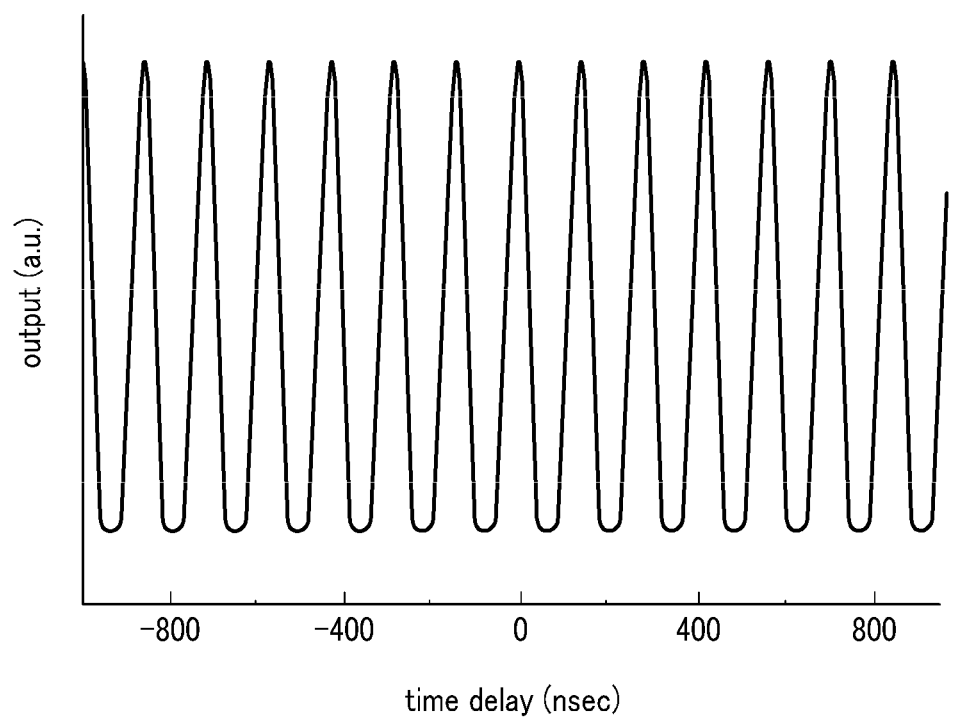
FIG. 9 is a graph that shows a laser pulse train measured by using an oscilloscope.

FIG. 9 is a graph showing a laser pulse train measured by an oscilloscope.

Here, the repetition rate of the pulse was 6.99 MHz. The formed pulse was analyzed to operate as a basic mode when the length of the laser resonance loop was considered. The duration of the $sech^2$ transform limited pulse was 1.31 ps, and intracavity power of the laser pulse device was measured as 21.41 dBm. Therefore, it was estimated that the present invention overcomes a limitation of the carbon based nano-material that is generally thermally damaged by a power of not less than 15 dBm.

According to an embodiment of the present invention, recovery of the laser pulse is made to be quick since the graphene with a broadband operating spectrum is used as a saturable absorption material. In addition, a laser pulse with a minimized pulse size can be manufactured. Stability of a nano-material used in a high power laser pulse device can be secured, and it can be applied to high integration of an optical circuit and fusion of the nano-material by introducing a method of forming a pulse functioning by the evanescent field and the graphene.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mode-locker that mode locks a laser mode that propagates through a laser oscillation loop, the mode-locker comprising:
   a core;
   cladding that surrounds the core, wherein a groove is formed on a side of the cladding, the groove that is extended along a propagating direction of the laser; and
   a graphene layer that is located in the groove and is formed to be extended along a direction to be parallel to a propagating direction of the laser such that the laser, which is propagated through the core, is configured to react with the graphene layer and then a laser pulse is formed.

2. The mode-locker of claim 1, wherein the groove comprises a flat surface and the graphene layer is formed on the flat surface.

3. The mode-locker of claim 1, wherein the graphene layer is formed by spray coating.

4. The mode-locker of claim 1, wherein the graphene layer is formed of single and/or multiple atom layers.

5. A mode-locker that mode locks a laser mode that propagates through a laser oscillation loop, the mode-locker comprising:
   fibers that are extended along one direction and are spaced apart from each other;
   a graphene layer that is located between fibers and neighboring the fibers and that is adapted to form a laser pulse; and
   a fixed member that surround the fibers,
   wherein the fibers comprise
   a core and
   cladding that surrounds the core, and
   the core contacts the graphene layer.

6. The mode-locker of claim 5, wherein the graphene layer comprises:
   a pair of first surfaces that are opposed to each other and contact the core; and
   a second surface that is located between the pair of first surfaces and connects the pair of first surfaces with each other.

7. The mode-locker of claim 6, wherein the graphene layer is formed by spray coating.

8. The mode-locker of claim 7, wherein the graphene layer is formed of single and/or multiple atom layers.

9. A laser pulse device comprising:
   an amplifier that amplifies a laser mode that propagates along a laser oscillation loop;
   a mode-locker that is connected to the amplifier and controls the laser;
   a polarization controller that is connected to the mode-locker and controls polarization of the laser;
   a coupler that is connected to the polarization controller and branches the laser;
   an isolator that is connected to the coupler and prevents backflow of the laser; and
   a fiber that connects the amplifier, the mode-locker, the polarization controller, the coupler, and the isolator with each other, and
   wherein the mode-locker comprises:
   a core;
   cladding that surrounds the core and having a groove formed on a side thereof, the groove that is extended along a propagating direction of the laser; and
   a qraphene layer that is located in the groove and is formed to be extended along a direction to be parallel to a propagating direction of the laser such that the laser, which is propagated through the core, is configured to react with the qraphene layer and then a laser pulse is formed.

10. The laser pulse device of claim 9, wherein the mode-locker comprises:
    fibers that are extended along one direction and are spaced apart from each other; and
    a fixed member that is located between the fibers and neighboring the fibers and that is adapted to form a laser pulse,
    wherein the fibers comprise
    a core and
    cladding that surrounds the core,
    wherein the core contacts the graphene layer.

11. The laser pulse device of claim 10, wherein the graphene layer comprises:
    a pair of first surfaces that are opposed to each other and face the core; and
    a second surface that is located between the pair of first surfaces and connects the pair of first surfaces with each other.

* * * * *